United States Patent
Pettit et al.

(10) Patent No.: US 11,567,651 B2
(45) Date of Patent: Jan. 31, 2023

(54) SYSTEM AND USER INTERFACES FOR RAPID ANALYSIS OF VIEWERSHIP INFORMATION

(71) Applicant: Palantir Technologies Inc., Denver, CO (US)

(72) Inventors: Andrew Pettit, New York, NY (US); Adam Schexnayder, New York, NY (US); Ashwin Sreenivas, Palo Alto, CA (US); Daniel Spangenberger, New York, NY (US); Gary Lin, San Jose, CA (US); Joules Nahas, Mountain View, CA (US); Lucas Lemanowicz, New York, NY (US); Matthew Elkherj, San Francisco, CA (US); Natasha Armbrust, New York, NY (US); Tomer Kremerman, Tel-Aviv (IL); Tinlok Pang, New York, NY (US); Yehonatan Steinmetz, Brooklyn, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 17/645,659

(22) Filed: Dec. 22, 2021

(65) Prior Publication Data
US 2022/0221983 A1 Jul. 14, 2022

Related U.S. Application Data

(63) Continuation of application No. 16/931,976, filed on Jul. 17, 2020, now Pat. No. 11,209,971.

(Continued)

(51) Int. Cl.
*G06F 3/0482* (2013.01)
*G06F 3/04847* (2022.01)
(Continued)

(52) U.S. Cl.
CPC ........ *G06F 3/04847* (2013.01); *G06F 3/0482* (2013.01); *G06F 16/245* (2019.01);
(Continued)

(58) Field of Classification Search
CPC ..... G06F 3/04842; G06F 9/451; G06F 16/435
See application file for complete search history.

(56) References Cited

U.S. PATENT DOCUMENTS 10,003,837 B2 * 6/2018 Joglekar .......... H04N 21/25883
10,085,074 B2 * 9/2018 Hood ................. G06Q 30/0251
(Continued)

*Primary Examiner* — Anil K Bhargava
(74) *Attorney, Agent, or Firm* — Knobbe, Martens, Olson & Bear, LLP

(57) ABSTRACT

Systems and methods are disclosed for systems and user interfaces for rapid analysis of viewership information. One of the methods includes accessing databases storing viewership information associated with segments, with each segment being associated with common features of viewers. Measures of association between the segment and content items are maintained for each segment. An interactive user interface is presented via a user device, the interactive user interface enabling creation of a customized viewing audience. The interactive user interface receives user input indicating a segment, identifies similar segments based on associations between features of the segment and of other segments, and presents the identified segments. Analysis information associated with the segments is presented for at least one of the one or more segments, with the segments being included in the customized viewing audience.

20 Claims, 12 Drawing Sheets

Related U.S. Application Data

(60) Provisional application No. 62/875,902, filed on Jul. 18, 2019.

(51) Int. Cl.

| | | |
|---|---|---|
| *G06F 16/245* | (2019.01) | |
| *G06F 16/25* | (2019.01) | |
| *G06Q 30/02* | (2012.01) | |
| *G06F 16/242* | (2019.01) | |
| *G06F 16/248* | (2019.01) | |
| *G06F 16/9032* | (2019.01) | |

(52) U.S. Cl.
CPC ........ *G06F 16/248* (2019.01); *G06F 16/2428* (2019.01); *G06F 16/252* (2019.01); *G06F 16/90324* (2019.01); *G06Q 30/0201* (2013.01)

(56) References Cited

U.S. PATENT DOCUMENTS

| | | | | |
|---|---|---|---|---|
| 10,122,808 | B2* | 11/2018 | Vickrey | G06F 16/24578 |
| 10,152,757 | B2* | 12/2018 | Benfield | G06F 16/783 |
| 10,182,258 | B1* | 1/2019 | Schlack | H04N 21/25891 |
| 10,250,951 | B2* | 4/2019 | Hood | G06Q 30/0276 |
| 10,326,964 | B2* | 6/2019 | Williams | H04N 5/23206 |
| 10,599,313 | B2* | 3/2020 | Calvillo | G06F 3/04847 |
| 11,209,971 | B1 | 12/2021 | Pettit et al. | |
| 2002/0129368 | A1* | 9/2002 | Schlack | H04N 21/44016 |
| | | | | 348/E7.071 |
| 2002/0194058 | A1* | 12/2002 | Eldering | G06Q 30/0242 |
| | | | | 705/14.69 |
| 2003/0018652 | A1* | 1/2003 | Heckerman | G06Q 30/0641 |
| 2003/0018659 | A1* | 1/2003 | Fuks | G06Q 30/02 |
| | | | | 707/999.005 |
| 2004/0177370 | A1* | 9/2004 | Dudkiewicz | H04N 21/4755 |
| | | | | 725/35 |
| 2005/0120391 | A1* | 6/2005 | Haynie | H04H 60/48 |
| | | | | 725/138 |
| 2011/0166932 | A1* | 7/2011 | Smith | H04N 21/812 |
| | | | | 715/835 |
| 2013/0185245 | A1* | 7/2013 | Anderson | G06Q 50/00 |
| | | | | 706/52 |
| 2013/0254025 | A1* | 9/2013 | Liu | G06Q 30/0255 |
| | | | | 705/26.7 |
| 2014/0053203 | A1* | 2/2014 | Csiki | H04N 21/4332 |
| | | | | 725/46 |
| 2014/0053204 | A1* | 2/2014 | Milano | G06F 3/04817 |
| | | | | 725/46 |
| 2014/0215506 | A1* | 7/2014 | Kalmes | H04N 21/4524 |
| | | | | 725/14 |
| 2015/0073954 | A1* | 3/2015 | Braff | G06Q 40/00 |
| | | | | 705/30 |
| 2015/0288782 | A1* | 10/2015 | Deng | G06F 16/9535 |
| | | | | 709/204 |
| 2016/0117718 | A1* | 4/2016 | Hood | H04N 21/2547 |
| | | | | 725/14 |
| 2016/0117719 | A1* | 4/2016 | Hood | G06Q 30/0273 |
| | | | | 705/14.42 |
| 2016/0366089 | A1* | 12/2016 | Bank | H04L 51/52 |
| 2018/0063596 | A1* | 3/2018 | Joglekar | G06Q 30/0251 |
| 2018/0350144 | A1* | 12/2018 | Rathod | H04W 4/021 |
| 2019/0188753 | A1* | 6/2019 | McConnell | G06Q 30/0277 |

* cited by examiner

Most unique segments for the selected parameters year: 2018, quarter Q3, parent_network: Provider A + 4 more

| rank<br>Integer | segment<br>String | segment_id<br>Long | source<br>String | uep<br>Double |
|---|---|---|---|---|
| 1 | hair care products (women) - used blow dryer | -87116640 | MRI | 24.91 |
| 2 | mascara (women) total users used in last 6 months total categ... | -1852427961 | MRI | 25.14 |
| 3 | lipstick & lip gloss (women) total users used in last 6 months to... | 1249140624 | MRI | 27.13 |
| 4 | hair care products (women) - used: any | 957216673 | MRI | 30.37 |
| 5 | women's clothing summary - low ticket bought three or more ite... | 710555558 | MRI | 29.87 |
| 6 | women's clothing summary - low ticket bought any | 1557843025 | MRI | 33.87 |
| 7 | women's clothing summary - low ticket bought any | 958315481 | MRI | 33.12 |
| 8 | foundation make - up (women) total users used in last 6 months... | -1632585941 | MRI | 24.20 |
| 9 | women's clothing summary bought three or more items | 968922980 | MRI | 30.58 |
| 10 | smartphone - type apple phone | 1397724972 | MRI | 33.08 |
| 11 | expenditures - amount spent in total beauty parlor / salon any | -356845789 | MRI | 23.23 |
| 12 | cellular / mobile phones / smartphones - handset brands apple ip... | -1696488327 | MRI | 33.07 |
| 13 | personal computers - at home or at work personally use a person... | -656196809 | MRI | 32.96 |
| 14 | women's lingerie / undergarments total users bought last 12 m... | -945607032 | MRI | 32.12 |
| 15 | banking & financial services - methods used banking online / inter... | -52330780 | MRI | 30.96 |
| 16 | internet-where looked / used at work | 326258110 | MRI | 35.02 |
| 17 | eye liner (women) total users used in last 6 months total categ... | 1369859989 | MRI | 21.78 |
| 18 | perfume and cologne for women total users used in last 6 months... | -2044058109 | MRI | 27.34 |
| 19 | internet-device used to look at or use laptop or netbook computer | -42640146 | MRI | 39.53 |
| 20 | medical insurance-how obtained from a place of work | -1178614456 | MRI | 32.82 |

Parameters year [2]: 2018
quarter [2]: 1 value...
parent provider [2]: 1 value... Prov. [2]
Content Item: 1 value...
daypart [2]:
source [1]: 1 value...
in_segment [1]:
parent provider universe:
provider universe:
daypart_universe [1]:

FIG. 6

SYSTEM AND USER INTERFACES FOR RAPID ANALYSIS OF VIEWERSHIP INFORMATION

CROSS-REFERENCE TO RELATED APPLICATIONS

This application is a continuation of U.S. application Ser. No. 16/931,976 filed on Jul. 17, 2020 and titled "SYSTEM AND USER INTERFACES FOR RAPID ANALYSIS OF VIEWERSHIP INFORMATION," which claims priority to U.S. Prov. App. No. 62/875,902 filed on Jul. 18, 2019 and titled "SYSTEM AND USER INTERFACES FOR RAPID ANALYSIS OF VIEWERSHIP INFORMATION," the disclosures of which are hereby incorporated herein by reference in their entirety.

This application further incorporates by reference herein the entirety of U.S. patent application Ser. No. 16/428,46, which is titled "SYSTEMS AND METHODS FOR DETERMINING AND DISPLAYING OPTIMAL ASSOCIATIONS OF DATA ITEMS" and which was filed on May 31, 2019.

TECHNICAL FIELD

The present disclosure relates to systems and techniques for accessing one or more databases and aggregating, analyzing, and displaying data in interactive user interfaces. More specifically, the present disclosure relates to systems and techniques for enhanced interactions with user interfaces and information discoverability.

BACKGROUND

Content providers may have access to rich datasets describing viewership information of their content items. Example content items may include web content, such as podcasts, webcasts, streaming content, and television content, and so on. These datasets may aggregate viewing behavior associated with disparate segments of an overall viewership population. For example, viewing behavior may represent rating information (e.g., viewer audience measurements, such as audience size and composition). In this example, different segments of the viewership population may be represented in the rating information. Each segment may include viewers which match particular features. As an example, a segment may include viewers who (1) have an interest in field hockey, (2) own a toothbrush, and (3) have recently traveled out of the country.

A content provider may use these datasets to track viewership information across different segments. Thus, the content provider may ascertain that a first segment views, or listens to, a particular content item more than a second segment. It may be appreciated that the content provider may additionally have a continual need to identify specific content (e.g., advertisements) to include in a content item. While these datasets may identify viewership information for disparate segments, it may present tremendous technological challenges to select a particular advertisement for inclusion in a content item.

The datasets described above may not allow for ease of analysis. For example, there may be tens of thousands of segments, or more, each with unique combinations of features and names for the features. Thus, a content provider may have difficulty identifying segments with which particular features are associated due to obfuscation of the features in the datasets. The level of analysis and data visualization required to identify optimal associations is thus beyond the capabilities of unaided humans and prior art systems.

SUMMARY

The systems, methods, and devices described herein each have several aspects, no single one of which is solely responsible for its desirable attributes. Without limiting the scope of this disclosure, several non-limiting features will now be discussed briefly.

This specification describes systems and methods which provide technological advantages and address prior technological shortcomings. As described herein, a system may aggregate information spread across large datasets. The system may then present succinct user interfaces which enable users to interrogate the datasets through simple user input. In the examples described herein, viewership information may be included in datasets. For example, viewing habits of viewers may be embedded within the datasets. As will be described, the system may analyze these datasets such that users may rapidly surface information derived from, or spread around, the datasets.

As a first example, the system may present, or enable, user interfaces to determine viewership information for a specified audience. The datasets may, as an example, indicate viewing information of specific segments of viewers. Example viewing information may include rating information for specific content items (e.g., web content, television shows, podcasts, and so on). Viewing information may further indicate time information associated with content items. For example, time information may include an average amount of time viewers in a particular segment watch certain content items. As described below, each segment may indicate a unique combination of features of viewers. For example, a segment may include users who own fishing equipment and have an interest in sports. As another example, a segment may include users who use smartphones of a specific type and who watch streaming content via smartphones.

While the above-described datasets may specify viewing information of large numbers of segments, a content provider may prefer aggregating, or further refining, the segments to define a particular audience. For example, certain content (e.g., advertisements) may be included in a content item and may be selected to comport with the preferences of a particular audience. Thus, the content provider may prefer to define a potential audience which combines different segments. In this way, the content provider may inform a selection of content for inclusion in a content item.

In this first example, the user interfaces may respond to user input specifying features of an audience of interest to a user of the user interfaces. For example, the user may specify a feature of owning fishing equipment. In this example, the user may prefer finding the viewing habits of an audience associated with this feature. As an example, the user may prefer identifying content items in which to include fishing advertisements, fishing-based product placements, and so on. Advantageously, the user interfaces described herein may rapidly surface any segment which is associated with this feature. For example, segments may include viewers who own fishing equipment, viewers who have recently searched a search engine for fishing equipment or the sport of fishing, and so on. In this example, the system may perform analyses with respect to the datasets to surface these previously obfuscated segments.

Furthermore, the system may use innovative techniques to identify segments which may be related to the surfaced segments. For example, a segment which includes viewers who own a boat may be determined to be related to the above-described surfaced segments. As another example, a segment which includes viewers who are known to live near, or have actually visited, a river may be determined to be related to the surfaced segments. These related segments may thus expand upon the user's audience.

Given the quantity of segments (e.g., tens or hundreds of thousands), it is impractical for a user to review these segments to determine related segments. Thus, a user may be required to leverage key-word searching. However, keyword searching will merely identify segments which include features precisely matching the specified keywords. Since similar, or same, features may have different names, may be misspelled, and so on, the user is unlikely to identify all responsive segments. Additionally, the user will be unable to identify segments determined to be related to the keywords. Thus, advantageously the system may use different techniques to determine segments which are similar, or likely to be similar, to other segments. In this way, the system may improve upon prior techniques which are technically cumbersome and add tremendous strain on end-users.

The user may then select from among the surfaced segments, and any related segments of interest, to define an audience. The system may then aggregate viewership information for the selected segments included in the audience. Advantageously, the user may specify Boolean expressions with respect to the segments. For example, the user may specify that viewership information representing an intersection, or a union, of two or more segments is to be determined. This complex processing may be performed by the system, and, in substantially real-time, analysis information may be presented to the user. Examples of analysis information for the defined audience may include viewership habits, content items preferred by viewers in the defined audience, content providers viewed by the viewers, demographic information, reach information, and so on. Advantageously, this analysis information may be presented for ease of understanding the complexities using different graphical depictions of the analysis information. In this way, the user may quickly create a particular audience and then determine their general, or fine-grained, viewing habits.

As a second example, user interfaces may enable users to identify segments which are responsive to particular constraints associated with content. For example, a user may specify a particular content item, such as a particular podcast series. In this example, the system may analyze the datasets to determine one or more segments which include viewers who are most likely to view, or have most viewed, the particular content item (e.g., a particular podcast series or other identified content item). Constraints may further include a particular content provider, a particular time frame, and so on. Via these user interfaces the user may therefore quickly determine an audience which is viewing particular content items or content items from particular content providers, which may be used, for example, in identifying an audience for another content item (e.g., a new podcast in a similar subject matter area).

The above-described techniques may be employed to enhance information discoverability which is otherwise impenetrably hidden in large datasets. Such techniques may, as an example, be used to determine optimal associations. The system may determine, for example, that individuals who enjoy outdoor activities (e.g., individuals in an "outdoor activities" segment) and who plan to buy a car in the next six months are watching a particular television program. A segment may be associated with particular media programming, for example, if viewers in that segment watch more minutes of the particular media programming than viewers in other segments. Advertisements relating to particular outdoor activities (e.g., automotive brands or products, for example vehicles which have features such as a roof rack or a large cargo capacity) may thus be optimally associated with available slots on the television program. In some embodiments, the system may correlate information regarding viewership of television programs (e.g., ratings) with information regarding viewers (e.g., information collected through surveys or other sources) to identify segments of viewership at a high level of detail. The system may thus provide detailed information regarding viewership which enables optimal associations.

The techniques described herein may thus present information regarding associations between content items and viewer segments. It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 3B illustrates an example user interface for selecting segments associated with the specified features.

FIG. 3C illustrates an example user interface presenting related segments.

FIG. 6 illustrates an example user interface presenting segments associated with content item constraints.

DETAILED DESCRIPTION

Introduction

Figure 1:
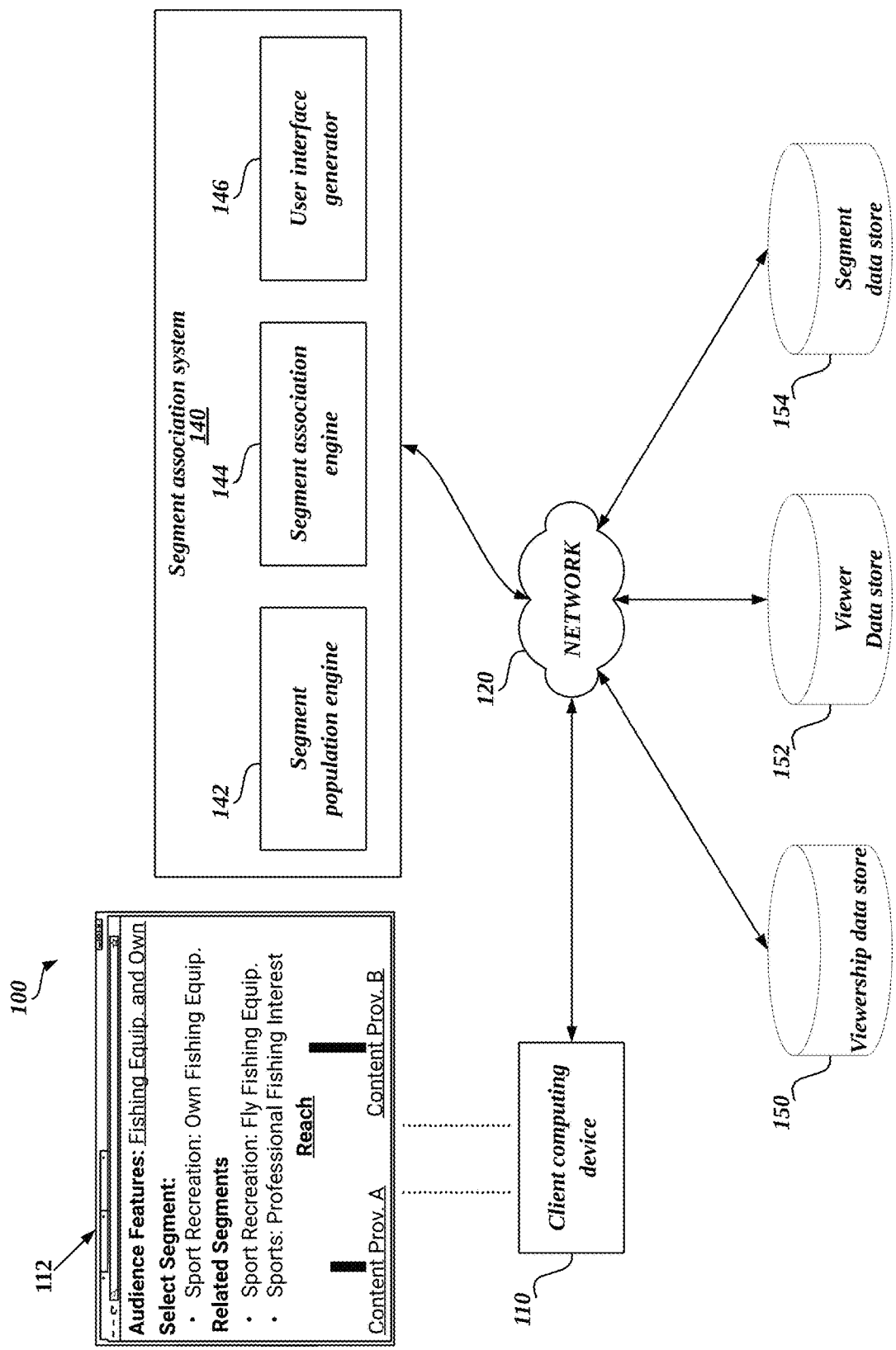
FIG. 1 is a functional block diagram depicting an example network environment for implementing a segment association system in accordance with aspects of the present disclosure.

This specification describes user interfaces and enhanced techniques for data discoverability, among other advantages. In the examples described herein, information may be obtained, or generated, which describe viewing information associated with multitudes of viewers. The viewing information may represent viewing (and/or listening) habits with respect to content items of content providers. A content item may be, for example, a radio broadcast, a podcast, a web-based streaming show, and so on. The information may be obtained from different datasets and indicate viewing information for specific segments of viewers. As described below, a segment may indicate viewing information for viewers which are associated with, at least, a same combination of features. A system described herein, for example, the segment association system 140, may analyze the information to provide complex workflows for users of the system.

With large datasets that may be received from multiple third-party entities and may use various (and often inconsistent) segment descriptions and formats, identification of segments that meet particular needs of a user is increasingly complex. For example, assigning a particular commercial to an available slot on a radio broadcast, podcast, or streaming media, may be a better use of the slot than assigning a different commercial which is less relevant to a viewing audience. However, an entity that is building an audience, for example, may not be able to determine which of several media items (e.g., advertisements) are most relevant to viewers of numerous slots. The entity may have access to the above-described information, such that general information about the viewing audience may be obtained. This information may allow the entity to eliminate assignments which are apparently suboptimal, such as product placements that target young adults in programs which are not popular with that demographic. However, the broad demographic categories provided by such data are not specific enough to allow determination of optimal associations.

The entity may also have access to data regarding individuals or households, such as surveys, activity logs, purchase histories, or other information. Such data may allow the entity to determine that a particular individual would be receptive to a particular advertisement. However, because the audience for mass media typically numbers in the millions, the entity cannot make optimal decisions by targeting individual viewers. Further, an unaided human cannot accurately sift through the sheer volume of data collected at the individual or household level to identify patterns and make optimal assignments.

Furthermore, the datasets described above may include tens, or hundreds, of thousands of segments. Thus, it may present technical challenges to extracts trends among these segments. Due to the fine-grained nature of the segments described herein, the entity may have difficulty associating a particular advertisement with a particular content item. For example, a segment may include features indicating that associated viewers play cricket and have traveled out of the state recently. In view of the large number of segments available, the user cannot practically identify those that may be related to this combination of features. However, as discussed further herein, a segment association system may provide automated functionality for segment discovery, such as to identify further segments that may be related, such as those associated with viewers that play other sports, have traveled to theme parks recently, have purchased saving equipment, and so on.

The above-described entity may be interested in identifying even further segments of relevance and aggregating segments to create a potential audience for a content item. As an example, the entity may prefer providing or identifying characteristics (e.g., characteristics of content). For example, the entity may prefer finding viewing information for viewers who play any sport or any sport associated with a particular characteristic (e.g., physical-touching allowed). Identifying viewing habits of an audience which plays a sport associated with a physical characteristic may be highly informative to the entity. For example, the entity may use the information to inform optimal association between advertisements and content items. Given the above-described datasets, however, the user may have no technical scheme to extract the segments which may form this potential audience. Therefore, without techniques to easily create a bespoke audience, the entity will be unable to optimally associate commercials with the viewing habits of the bespoke audience.

Additionally, the entity may prefer interrogating the datasets to quickly identify one or more segments which are determined to be most associated with a content item, which may also provide segment information useable in defining audiences. For example, certain datasets may be provided as textual information included in spreadsheets, data structures, and so on. These datasets may be prepared by third-party entities, and may comprise different forms, schemas, and so on. Thus, certain of the datasets may provide for additional information as compared to other of the datasets. For example, and with respect to spreadsheets, certain of the datasets may include additional columns of information.

Thus, it may be technologically impractical for the entity to identify segments which are determined to be most associated with a particular content item. For example, the entity may have to navigate different schemas, formats, naming conventions, and so on. Additionally, such information will be encoded in hard to parse datasets. Therefore, the entity will have no quick visual tool to extract the requested information. The entity may additionally prefer more complex information. For example, the entity may prefer identifying segments which are most associated with a collection of content items or with certain content items but not with other content items. As another example, the entity may prefer identifying segments which are most associated with a particular content provider.

The techniques described herein may address, at least, the above-described technical problems associated with data analyses. For example, the system described herein may improve upon prior techniques to associate specific content (e.g., advertisements) with content items. Advantageously, and as described in more detail below with respect to FIG. 2, for example, one embodiment of the system may enable a user of the system to create the user's preferred audience. For example, the particular audience may represent a union, intersection, or disjoint, of multiple segments. For example, a user may use a user interface to create a particular audience which represents the intersection of a first segment and a second segment. In this example, the user may further indicate that the particular audience is to be disjoint with a third segment.

The system may determine viewership information for the above-described particular audience, and then update the user interface to present analysis information based on the viewership information. The user may use the analysis information to inform selection of an advertisement for inclusion in a content item. Additionally, and as will be described in more detail below, a user may use a user interface to quickly specify constraints associated with content. An example constraint may indicate, for example, a particular content item of interest to the user. Another example constraint may indicate a particular content provider. Based on the constraints, the system may determine segments which are most associated with the constraints. For example, and with respect to a particular content, the system may determine one or more segments which most watch the particular content item.

Overview

Accordingly, systems and methods are described for providing tools that determine and display optimal assignments of content items. For example, the system can process data regarding individuals or households to identify segments of viewers. As described above, segments of viewers may have common features. For example, individuals who all gave the same answer to a particular survey question (e.g., "do you have a valid passport?" or "have you purchased a mobile phone in the past twelve months?") may be identified as a segment. Features that define a segment may include, for example, recent activities, planned activities, food or drink preferences, professions, employment statuses, medical conditions, hobbies, political affiliations, or other such features.

In some embodiments, segments may be identified based on the answers to multiple survey questions (e.g., individuals whose answers indicated that they work more than 40 hours per week, frequently travel by air, and have not taken a vacation recently may be identified as a "business traveler" segment). In some embodiments, segments may be determined for an individual based on surveys of the individual's household. For example, the answers to a household survey may indicate that the household includes young children. One or more adults residing at the household may thus be identified as members of a "parents of young children" segment. In some embodiments, segments may be identified based on information derived from activities of individuals (e.g., an individual that makes a purchase at a specialty biking store every week may be associated with a bike enthusiast segment). The number of segments that could be identified may number in the tens of thousands, or more, and may involve interdependencies and patterns that would be impossible for an unaided human to discern or properly interpret.

The system described herein may further process data regarding the viewing habits of individuals, including at least some of the individuals who have been classified into segments. This data may be referred to herein as measures of association or information reflecting associations. The system may thus determine a degree of association (e.g., measure of association) between various segments and the content items that are viewed. For example, the system may determine a degree of association between a first segment (e.g., people who have purchased a computer within the past twelve months) and each of a plurality of content items (e.g., the first segment could be scored with reference to a television program with a science fiction theme, as well as numerous other content items). The system may further determine another degree of association between a second segment (e.g., people whose hobbies include cooking) and the same plurality of content items. The system may then generate user interfaces that display the degrees of association between various segments and content items, and thereby enable interactive determination of optimal content item assignments. For example, the system may indicate that the "people who have recently purchased a computer" segment has a higher degree of association with the sci-fi program than with a cooking program, and thus an advertisement targeting recent computer buyers would be optimally assigned to an advertising slot on the sci-fi program. The system may identify and display degrees of association that would be unexpected or counterintuitive to an unaided human, and may identify and display degrees of association for segments that have no obvious affinity to any particular genre or category of content items. The system may thereby enable optimal associations that would not otherwise be achieved.

A user interface may, as an example, be used to present segments determined to be optimally associated with a content item. The user interface may, as an example, thus include user interface elements associated with specifying a time period, a data source (e.g., one or more datasets), a content provider, a timeslot, and so on. Via simple user input the user of the user interface may thus surface segments, among the plethora of segments, which are optimally associated. Further description related to the user interface, and processes (e.g., low diagrams) for determining degrees of association between content items and segments of viewers, is described in U.S. patent application Ser. No. 16/428,46, which is hereby incorporated herein by reference in its entirety. For example, FIG. 2A illustrates an example user interface and FIG. 3A describes an example process.

As another example, a user interface may, as an example, be used to present content providers associated with specified segments. The user interface may, as an example, thus include user interface elements associated with specifying a segment or features thereof. In this way, a user of the user interface may rapidly determine which segments are optimally associated with a content provider. Further description related to the user interface, and processes (e.g., low diagrams) for determining degrees of association between content items and segments of viewers, is described in U.S. patent application Ser. No. 16/428,46, which is hereby incorporated herein by reference in its entirety. For example, FIG. 2B illustrates an example user interface and FIG. 3B describes an example process.

As described above, the user interfaces described herein may improve upon prior techniques to surface viewership information. For example, a user may prefer creating a potential viewing audience. The potential viewing audience may be created by the user to include certain features. This viewing audience may be aggregated based on a multitude of segments. As will be described below, with respect to at least FIGS. 2-3C, a user may leverage user interfaces to quickly create such a potential viewing audience. Via the innovative back-end processing techniques described herein, the creation may require limited user input. For example, the user may specify one or more features. The user may then select from among existing segments which are associated with the specified features. Advantageously, the system may use innovative techniques to determine related segments. These related segments, which would otherwise be hidden amongst the multitude of segments, may be selected by the user and included in the created viewing audience.

While the present disclosure may use television programs and advertisements as examples, it will be understood that the present disclosure is not limited to any particular medium or method of delivery. For example, content items may include radio broadcasts, webcasts, podcasts, streaming media, social media, augmented reality content, virtual content, and the like, and may be associated with network-based advertisements (e.g., advertisements viewed or heard in video games, social media, mobile applications, etc.), advertisements preceding or following movies, augmented reality advertisements based on a user's location or content being viewed, product placements, announcements or displays at sporting events, physical kiosks and displays, and so forth.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Content item: An item of content that may be viewed, heard, or otherwise consumed. Content items may include audio content, video content, and/or other content. Examples of content items include television programs, radio programs, commercials, podcasts, webcasts, streaming content, augmented reality content, live-streams, and so one. Reference to viewing a content item may be understood to include watching a content item, listening to a content item, hearing a content item, interacting with a content item (e.g., an interactive content item, such as streaming content, augmented or virtual reality content), and so on.

Data Store: Any non-transient computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Content Provider: A content provider of one or more content items, such as a television network, internet service provider, broadcaster, podcaster, and so on. In some contexts, a content provider may be referred to as a "provider," "network," or "television network." It will be understood that such references are provided for purposes of example, and do not limit the present disclosure to a particular type of content provider.

Viewer: A consumer of content, including multiple forms of content. Thus, the term "viewer" should be understood (unless the context requires otherwise) as including consumers of audio or other content formats.

Segment: A portion of a set of viewers that shares one or more features or attributes. A segment may be defined in terms of demographic, geographic, psychographic, and/or other features, such as behaviors or activities (past, present, or future), interests, hobbies, or other identifiable patterns. Segments may be identified in different datasets or databases, such as datasets which tracking viewership information of viewers included in segments.

Timeslot: A time interval associated with a content item, such as the day of the week and time of day at which a network television program is typically broadcast. Unless the context requires otherwise, "timeslot" may be used interchangeably with "content item" to reference content that airs on a particular day and time.

Example Embodiments

FIG. 1 is a block diagram of an example system 100 for optimal association of content items in accordance with aspects of the present disclosure. As shown, the example system 100 includes a client computing devices 110, a segment association system 140, and data stores 150, 152, and 154, which may communicate with each other via a network 120.

The client computing device 110 can be any computing device that implements aspects of the present disclosure, and may include one or more software applications such as web browsers, mobile applications, messaging services, or other applications. Example computing devise may include mobile devices, wearable devices, laptops, computers, augmented reality devices, and so on. In some embodiments, multiple client computing devices 110 may communicate with the segment association system 140. In any event, a user or users may interact with the example system 100 through any number of client computing devices 110.

Figure 7:
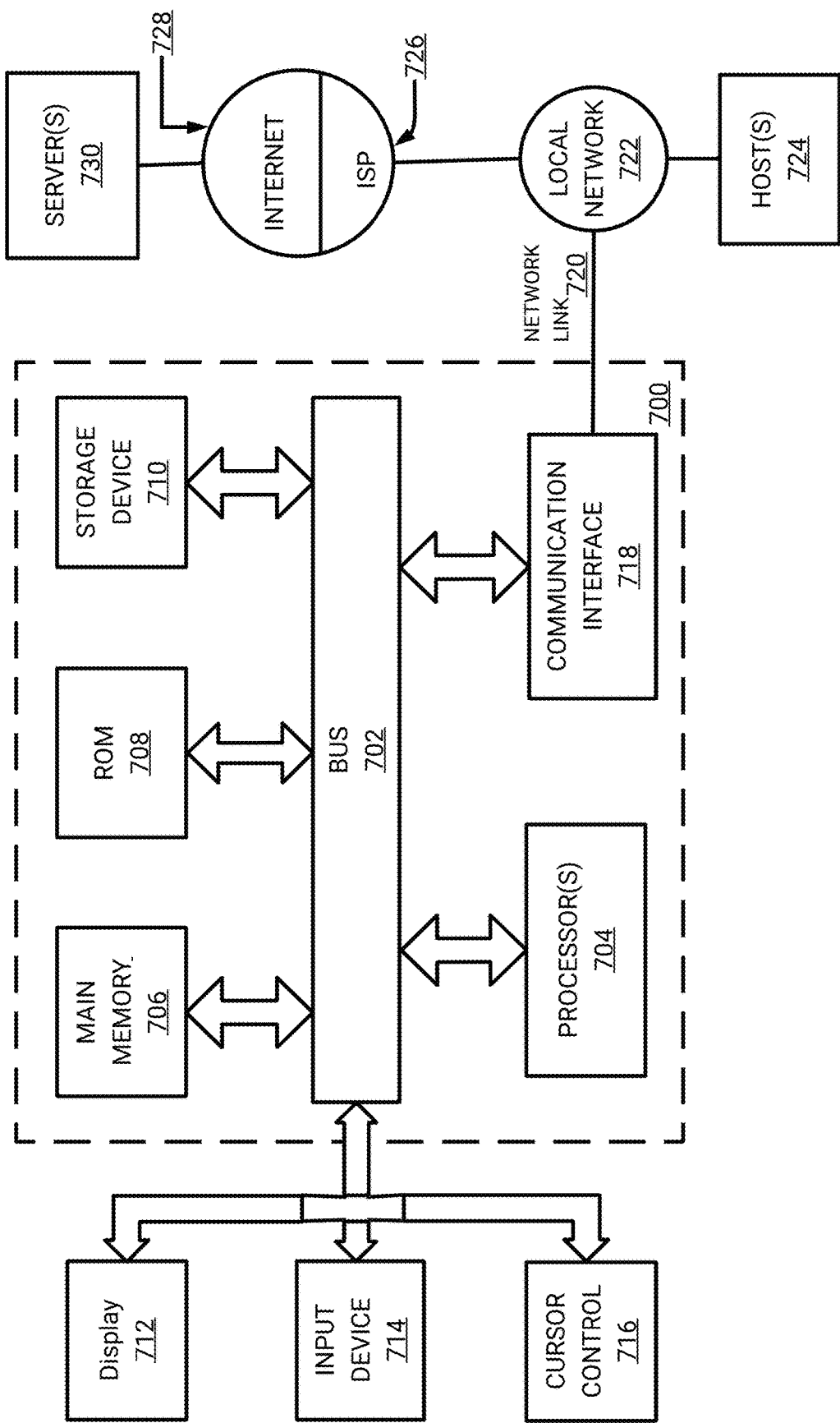
FIG. 7 is a block diagram depicting a general architecture of an example computing device for implementing a segment association system in accordance with aspects of the present disclosure.

The segment association system 140 can be a computing system configured to make associations between content items (e.g., television programs, streaming media, and the like, as discussed above) and segments of viewers that are of interest to advertisers. For example, the segment association system 140 can be a computer system configured to execute software or a set of programmable instructions that process viewer data, segment data, and viewership data to determine associations, and display the resulting associations in one or more user interfaces. In some embodiments, the segment association system 140 can be implemented using a computer system 700, as shown in FIG. 7 and described below.

The segment association system 140 can include one or more computing devices (e.g., server(s)), memory storing data and/or software instructions (e.g., database(s), memory device(s), etc.), and other known computing components. According to some embodiments, the segment association system 140 can include one or more networked computers that execute processing in parallel or use a distributed computing architecture. In some embodiments, the segment association system 140 may be a system of one or more computers, one or more virtual machines executing on a system of one or more computers, and so on. The segment association system 140 can be configured to communicate with one or more components of the system 100, and can be configured to securely provide information via an interface(s) accessible by users over a network (e.g., the Internet). For example, the segment association system 140 can include a web server that hosts a web page accessible through network 120. In some embodiments, the segment association system 140 can include an application server configured to provide data to one or more client applications executing on computing systems connected to the segment association system 140 via the network 120.

The data stores 150, 152, and 154 may illustratively be any computer-readable data stores that implement aspects of the present disclosure. For example, the data stores 150, 152, and 154 may be magnetic media such as hard disc drives, solid state devices, flash drives, databases, lists, or any other non-transient computer-readable data stores. The viewership data store 150 may store viewership information regarding viewership of particular content items. For example, the viewership data store 150 may store ratings or other data that identify individual viewers and the content items (or portions of content items) that they viewed during a particular time period. The viewer data store 152 may store information regarding individual viewers, such as individual or household survey responses, activity logs, or other data that enables classifying viewers into segments. The segment data store 154 may store information regarding viewer segments, and in some embodiments may store the results of classifying viewers into segments. In some embodiments, one or more of the data stores 150, 152, 154 may be implemented as a single data store, such as a relational database.

The data stores 150, 152, and 154, may store information derived from datasets including viewership information. The datasets may, as an example, be generated by third-party providers who monitor, or otherwise determine, viewing habits of viewers. The datasets may be provided in a preferred format by the third-party provider. For example, a certain dataset may include viewership information in a spreadsheet. In some embodiments, a dataset may be in the form of a spreadsheet may specify unique identifiers associated with segments along with viewing information for the segments. The viewing information may be included in different columns of the spreadsheet, with each column being designated by an identifier (e.g., a name). For example, the information may indicate minutes viewed of certain content items. As another example, the information may indicate rating information for each content item. Certain datasets may include viewing information indicating specific instances of viewing by viewers. For example, the information may specify times at which a podcast was listened to or times at which particular streaming content was accessed.

Thus, in some embodiments, the segment association system 140 may derive viewership information to enhance a speed at which processing may take place. To derive information, the system 140 may determine schemas used for each dataset. In some embodiments, the schemas may be obtained from third-party providers. Thus, the schema may be ingested and used to interpret the included viewership information. As an example of determining a schema, the segment association system 140 may access the identifiers (e.g., names) for different types of viewership information. The segment association system 140 may then determine corresponding types of viewership information based on analyses of these identifiers. In some embodiments, the segment association system 140 may identify candidates of matching types of viewership information between datasets.

As an example, the segment association system 140 may obtain a name of a type of viewership information included in a particular column of a dataset. The segment association system 140 may determine similarities with other names included in other datasets. As an example, the segment association system 140 may use deep-learning techniques to generate a word embedding for each name. As another example, the segment association system 140 may determine metrics, such as a Levenshtein distance, between words. In this way, the segment association system 140 may determine types of information which match between datasets.

To derive viewership information, the segment association system 140 may aggregate information included in the datasets. For example, the segment association system 140 may identify all information specific to a certain segment. The segment association system 140 may then store the aggregated information for the certain segment. This aggregation may optionally be performed upon receipt of one or more datasets. In this way, the segment association system 140 may determine specific metrics derived from the datasets. An example metric may include minutes of viewing for specific content items. In this example, the segment association system 140 may aggregate all instances of viewing by any viewer associated with a same segment for each content item. This information may thus be rapidly presented to users in the user interfaces described herein.

In some embodiments, the segment association system 140 may obtain viewership information in substantially real-time. For example, the segment association system 140 may receive information pushed from systems (e.g., servers) which provide content items to users. As an example, a content delivery network may monitor times at which content items are requested for presentation by users. In this example, the content delivery network may transmit instances of viewing to the segment association system 140. In all situations in which viewing information is used, it may be appreciated that users may, as an example, be required to affirmatively consent to such use or opt-in for the use.

The example system 100 further includes a network 120, through which the client computing device 110, segment association system 140, and data stores 150 and 152 may communicate. The network 120 may illustratively be any wired or wireless network, including but not limited to a local area network (LAN), wide area network (WAN), Wi-Fi network, Bluetooth network, cellular network, mesh network, the Internet, or other network or networks. In some embodiments, the system 100 may include multiple networks 120. For example, the client computing device 110 and the segment association system 140 may communicate via the Internet, and the segment association system 140 and the data stores 150, 152, and 154 may communicate via a LAN.

As will be described in more detail below, the segment association system 140 may enable different workflows via front-end user interfaces presented on the client computing device 110. An example workflow may include creation of an audience and viewing analyses of viewership information for the created audience. FIG. 1 illustrates an example of a user interface 112 which may be used to create an audience. The user interface 112 may be an example of a user interface accessible via a browser executing on the client computing device 110. For example, the user interface 112 may represent a front-end of a web application. In some embodiments, the segment association system 140 may execute the web application. In some embodiments, the segment association system 140 may provide information to another system for inclusion in the user interface 112. The user interface 112 may also represent a user interface of an application. For example, the application may be an application available via an application store (e.g., an 'app'). In this example, the user interface 112 may be rendered by the application and receive information from the segment association system 140 for inclusion in the user interface 112. User input may optionally be provided to the segment association system 140 for processing. In some embodiments, the application may request information from the system 140 based on received user input. In some embodiments, the system 140 may respond to application programming interface (API) calls or endpoints.

The user interface 112 includes an input portion in which the user has specified features of an audience. In the example, the user has specified features of 'fishing' and 'own'. These features may be used to identify segments which include the specified features. For example, the segment association system 140 may determine whether any segments include the words, 'fishing' and 'own'. The segment association system 140 may also determine words which are similar to the specified words. In response, the user interface 112 may update to reflect segments included in the segment data store 154 which are responsive to specified features.

A user of the user interface 112 may then select one or more of the responsive segments. Advantageously, the segment association system 140 may, in some embodiments, determine related segments to the selected segments. For example, the segment association system 140 may determine similarities between features. The segment association system 140 may thus surface segments which may be relevant to a goal of the user of the user interface 112. Analysis information may then be presented in the user interface 112. As will be described in more detail below, the segment association system 140 may determine reports for presentation. The reports may include, as non-limiting examples, demographic information, rating information, reach information, and so on. In the illustrated example, user interface 112 includes reach information which may represent, as an example, the unduplicated percentage of a population that is exposed at least one time to the portion of an advertising campaign included in a selected content item during some period of time.

As will be described below, in some embodiments users may interact with the segment association system 140 via voice commands. For example, the techniques described herein may be headless. In these examples, the user may provide voice commands regarding features associated with an audience being created by the user. The client computing device 110 may be a speaker or other audio element which outputs responses received from the system 140 or a system in communication with the system 140. Thus, the device 110 may identify, using natural language, segments responsive to the features. The device 110 may additionally output natural language identifying related segments. The user may provide voice commands selecting certain segments, and the device 110 may use natural language techniques to describe analysis information.

It will be understood that FIG. 1 is provided for purposes of example, and that the system 100 may include more, fewer, or different configurations of devices than the example illustrated in FIG. 1. For example, one or more of the data stores 150, 152, and 154 may be implemented as components of the segment association system 140. As a further example, a server, proxy, or other device may serve as an intermediary between the client computing device 110 and the segment association system 140. The present disclosure is thus understood to include many embodiments beyond the example provided in FIG. 1.

Figure 2:
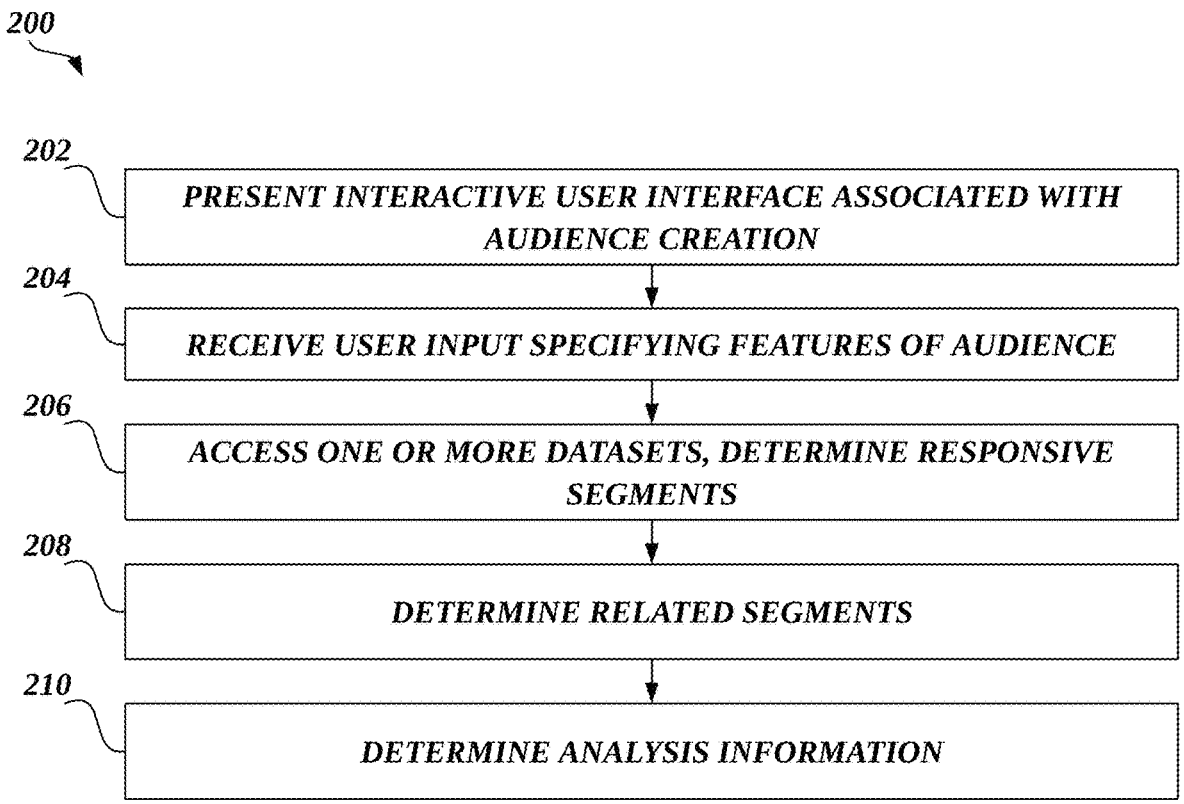
FIG. 2 is a flowchart of an example process for presenting analyses of a created audience comprising one or more segments.

FIG. 2 is a flowchart of an example process 200 for presenting analyses of a created audience comprising one or more segments. For convenience, the process 200 will be described as being performed by a system of one or more computers (e.g., the segment association system 140).

At block 202, the system presents an interactive user interface associated with audience creation. As described above, with respect to at least FIG. 1, the system may determine analyses of information associated with a customized viewing audience. These analyses may inform association between advertisements and content items as described herein. As will be described below, a user of the interactive user interface may specify features of interest to the user. The system may then determine analyses of information, such as viewership information, for segments associated with these specified features.

It may be appreciated that certain viewers may prefer, or be known (e.g., based on the datasets described herein) to view, certain content items. Additionally, certain viewers may prefer, or be known to view, certain content providers than other viewers. A user of the interactive user interface described herein may prefer to understand information associated with viewers included in a unique audience. The unique audience may be defined, at least in part, by specific features. These features may, as an example, not directly correspond to any one segment. For example, the user may prefer viewing analyses of viewers who (1) own fishing equipment, (2) indicated they travel greater than a threshold distance to eat at restaurants, and (3) so on. It may be technically difficult for the user to extract relevant viewership information for responsive users.

In the above-described example, the user may use the interactive user interface to specify features of (1) own fishing equipment and (2) travel to eat at restaurants. The user, as an example, may be using the interactive user interface to understand the viewing habits of these viewers. Advantageously, and illustrated in FIGS. 3A-3C, user interfaces described herein may enable the surfacing of segments which are responsive to the above-identified features. Additionally, analyses of information associated with these segments may be succinctly provided. This information may optionally be provided in reports for ease of consumption to the user of the interactive user interface.

In this way, the user may thus quickly create an audience corresponding, at least, to the above-identified features via minimal user input. This created audience may thus represent viewers included in disparate segments. Information, such as viewership information, may then be aggregated for the viewers and presented in the interactive user interface. As an example, the user may quickly view rating information for these viewers. As another example, the user may quickly understand demographic information, such as economic information, for these users.

Thus, via the user interface described herein, the user be informed as to association between advertisements and content items or content providers. For example, the user may understand which content items or content providers are viewed by viewers associated with certain features. This information may be obfuscated, or technically difficult to obtain, based on analyses of the datasets described herein.

At block 204, the system receives user input specifying features of an audience. As described above, the user of the interactive user interface may specify features. The interactive user interface may respond to textual user input. In some embodiments, the interactive user interface may respond to voice commands. In some embodiments, the interactive user interfaces described herein may be headless. In these embodiments, the user may provide voice commands identified features of an audience to an intelligent personal assistant. The system may receive the features and determine segments responsive to the voice commands. The system may then cause the intelligent personal assistant to output (e.g., via simulated speech) analyses of information associated with the determined segments.

Figure 3A:
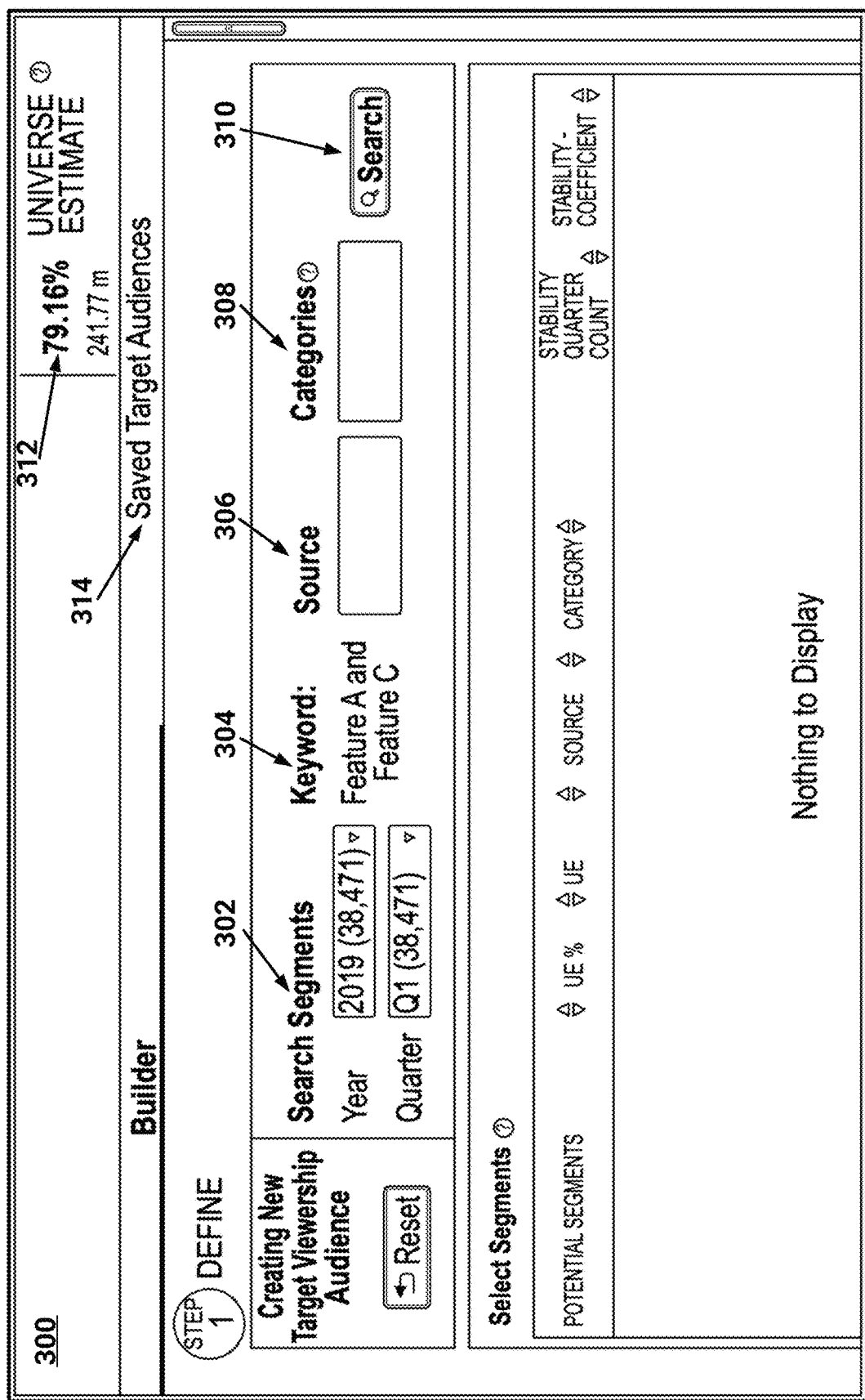
FIG. 3A illustrates an example user interface for creating an audience based on specified features.

Reference will now be made to FIG. 3A, which illustrates an example user interface 300 for creating an audience based on specified features. In the illustrated example, the user interface 300 includes an input portion 302 to specify a time period of interest. The time period of interest may inform which datasets, or which portions thereof, are to be used to create an audience. For example, the user of user interface 300 has selected a particular year (e.g., '2019') along with a particular quarter (e.g., 'Q1').

User interface 300 further includes a feature portion 304 in which features of viewers may be specified. As described above, the features may correspond to features associated with segments. For example, the user of user interface 300 include features which are specified by one or more segments. However, advantageously the user may specify words of interest to the user. As an example, the user may indicate the word 'fishing'. There may be no segment which has a feature of 'fishing'. Instead, there may be features which describe aspects of fishing, such as 'own fishing equipment,' 'subscribe to fishing magazines,' and so on. The user interface 300 may thus surface these segments.

Additionally, there may be no segment with the word 'fishing'. The system may review the features of segments and determine measures of similarity between the words and the specified word 'fishing'. For example, the system may determine word embeddings, such as vectors associated with a word feature space. Word embeddings may, as an example, may be mapped to vectors of real numbers using example deep-learning techniques (e.g., GloVe, and so on), dimensionality reduction, co-occurrence matrices, and so on. The system may then determine measures of similarity between the word embeddings, for example a cosine distance between the word embeddings. In this way, the system may identify candidate words which are similar to a specified word in the user interface 300. The system may optionally use other (or additional) techniques, such as a Jaccard measure, Levenshtein distance, and so on. The user interface 300 may update to present words determined to be similar to a word specified by the user. The user may provide user input selecting a presented word or may indicate that a specified word is not similar. In some embodiments, the system may update techniques to determine similar words based aggregations of such user input. For example, machine learning models may be updated using the user input as training information.

Figure 3B:
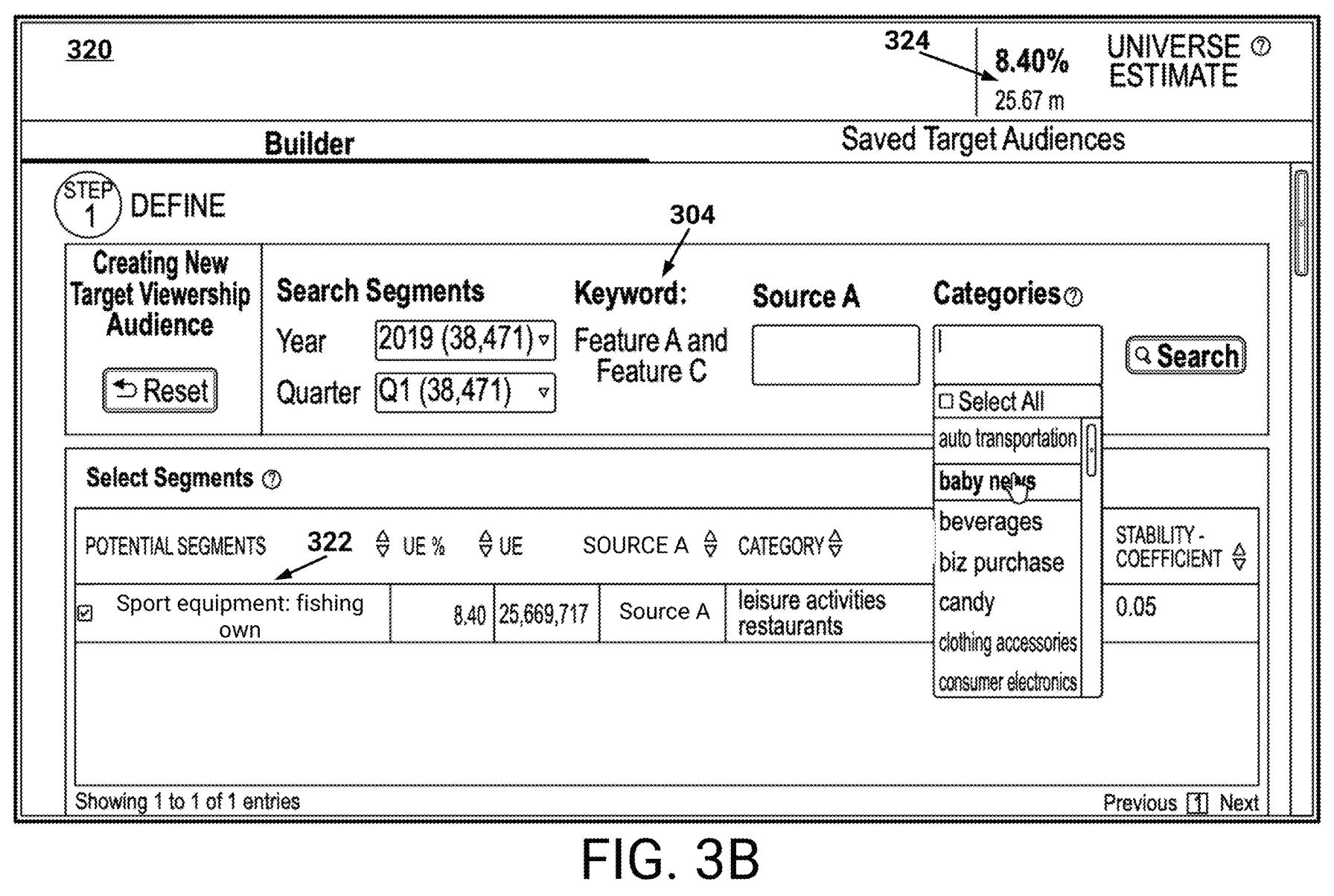

User interface 300 includes input portions 306 and 308 to specify a source and one or more categories. The source may indicate a particular dataset or a collection of datasets. For example, the user of user interface 300 may indicate an identifier associated with a third-party provider. The system may then identify datasets which are associated with the third-party provider. For example, the datasets may have been generated by the third-party provider. A category may represent a category of feature. For example, the categories may correspond to products or services. Example categories are illustrated in FIG. 3B with respect to portion 308.

In some embodiments, the user interface 300 may enable specification of a particular type of content item. For example, the user may indicate that only viewers of podcasts are to be identified. As another example, the user may indicate that only viewers of augmented reality content are to be identified. In this way, the system may determine segments, or information associated with segments, specific to a type of content item.

The user may optionally interact with interactive element 310 to cause the system to determine segments which are responsive to the specified features 304. As described above, in some embodiments the user may provide verbal commands specifying the features. In these embodiments, the user may thus not interact with an interactive element 310. It may be appreciated that specifying features may reduce a total number of viewers. For example, as increasing features are specified the viewers who are associated with the identified feature may be reduced. Thus, advantageously the user interface 300 provides an indication 312 of a total measure of viewers implicated by the specified features 304. For example, the measure may represent a total number of a percentage of a total number of viewers. In this way, the user of the user interface 300 may determine whether additional features are to be added or removed. For example, the user may prefer that creating a highly tailored audience. In some embodiments, the user may save audiences previously created by the user interface 300. The user may access these saved audiences via element 314.

At block 206, the system determines responsive segments. As described above, the system analyzes the specified features and determines segments which are associated with these features. The system may, as an example, perform a keyword matching scheme to identify segments which are associated with the specified features. For example, if a feature specified by the user of the interactive user interface is a particular word, then the system may identify any segments which are associated with this word. As another example, the system may use deep-learning techniques to identify responsive segments. For example, the system may use word embeddings to identify features which are close in an example feature space.

The determined segments may then be presented in the interactive user interface. These segments may therefore represent segments which are represented in the datasets described herein. For example, the segments may be included in the segment data store 154 described above with respect to FIG. 1. The system may thus receive selection of one or more of the representative segments.

In some embodiments, the features specified by the user may be assigned a weight or importance. For example, the user may indicate a first feature of 'fishing equipment' and a second feature of 'own.' However, the user may additionally indicate that the feature 'fishing equipment' is to be weighted higher or assigned a greater importance. As may be appreciated, there may be hundreds of thousands or more segments. Thus, the system may update the interactive user interface to present a substantial number of segments for selection by the user.

In the above-described example, too great of a list (e.g., in length) may present a poor user experience, the system may therefore place certain segments higher in the list. An example technique may use the weight or importance to include certain segments higher. With respect to the example, the system may present segments associated with owning fishing equipment higher than the feature of owning goods or services. Additionally, the system may present segments associated with both features higher than those of other segments.

The features may additionally be included in a Boolean expression. For example, and with respect to the above, the user may specify an example Boolean expression such as 'fishing equipment and own,' or 'fishing equipment and/or own,' and so on. In the former Boolean expression, the system may identify segments which are associated with both of the features. In the latter the system may identify segments associated with either of the features. For this example, the system may include segments which have both features higher in a presented list.

Reference will now be made to FIG. 3B, which illustrates an example user interface 320 for selecting segments associated with the specified features. User interface 320 illustrates segments 322 which are responsive to the specified features 304. As described above, the user may select one or more of the segments for inclusion in an audience being created. In the illustrated example, the user has selected the segment of, 'Sport equipment: fishing own.'

Upon selection of one or more segments, the indication 324 of a total number of viewers may be updated. In the example of FIG. 3B, the total number has been reduced from '79.16%' to '8.4%'. Thus, a total number of viewers who are implicated by the features may be 79.16%. However, a total number of viewers included in the selected segment 322 may be '8.4%'.

At block 208 the system determines related segments. As described above, for example with respect to FIG. 1, the system may surface segments which are related to one or more segments selected by the user. For example, the system may access, or generate, word embeddings of the words or expressions used as features of the selected segments. The system may then determine other segments which are close in a feature space to the words. For example, a cosine distance may be computed. Other example techniques may be used, such as using the universal sentence encoder, GloVe, variational auto encoders, and so on.

In some embodiments, the system may perform an example process which leverages multiple steps to enhance a similarity determination process. For example, the system may compare two segments. In this example, one of the segments may represent a selected segment and the other segment may represent a segment under consideration. The system may determine a jaccard similarity (e.g., set intersection/set overlap) between a person (e.g., viewer) composition of the two segments. The system may additionally determine a jaccard similarity between the features of the segments (e.g., the segment name as represented in a dataset). Advantageously, the system may blacklist (e.g., not use) common words or tokens. The system may optionally use a count of a total number of viewers in each segment, such as counting persons in the candidate segment. The system may determine a ratio of a number of viewers in each of the segments. For example, the ratio may represent a ratio of viewers in the candidate segment to viewers in the selected segment.

With respect to the above, the system may additionally determine statistical information. For example, the system may compute:

$$g_{stat} = df|'\text{count}'| * F \cdot \log(df|'\text{count}'|) * F \cdot lit(\text{distinct\_people})/df$$
$$|'\text{count\_candidate\_segment}'| * df|'\text{count\_selected\_segment}'|$$

In the above example, the 'count' may represent a total number of viewers aggregated (e.g., summed) from each of the two segments. The 'distinct_people' may represent a total number of distinct viewers associated with the two segments (e.g., a same person may optionally be included in multiple segments). The 'count_candidate_segment' may represent a total number of viewers in the candidate segment. The 'count_selected_segment' may represent a total number of viewers in the selected segment. In some embodiments, 'count_candidate_segment' may be referred to as 'count_right' and 'count_selected_segment' may be referred to as 'count_left.'

The $g_{stat}$ may represent a measure of whether membership in one segment affects membership in the other segment. In some embodiments, the $g_{stat}$ may be related to contingency tables. The higher the statistic the more likely it may be that knowing membership in a first segment (e.g., the selected segment, the candidate segment) provides information about membership in a second segment (e.g., the candidate segment, the selected segment). For example, a first segment may be associated with features, 'does not often drink beer.' In this example, a second segment may be associated with features, 'Prefers Brand A of beer.' As non-limited examples, a probability of a viewer (e.g., person) being in the first segment is 33% and a probability of a viewer (e.g., person) being in the second segment is 10%. If the population is large enough to infer the 33% population with greater than a threshold measure of conviction, then the $g_{stat}$ would be large. In this way, the system can determine that knowing information about whether a viewer (e.g., person) is in the first segment provides information about whether the viewer also prefers 'Brand A' of beer.

The above described information may be provided to example functions which squash values between a certain range (e.g., sigmoid, tanh, and so on). With respect to a sigmoid, the above-described information may thus be squashed between respective 0 and 1 values. These values may be aggregated and a determination as to similarity may be made. The determination may be based on a probability or value which is obtained from the squashed values. For example, sigmoid values may be interested as probabilities. In some embodiments, a neural network may be used to learn similarity. For example, one or more layers of the neural network may use the information escribed above to determine similarity. Activation functions, such as rectified linear units, tanh, sigmoids, and so on, may be used in the neural network. In some embodiments, a final layer of the neural network may determine a probability associated with two segments being similar. For example, a sigmoid activation function may squash values between 0 and 1. The resulting value may then be interpreted as a probability.

Figure 3C:
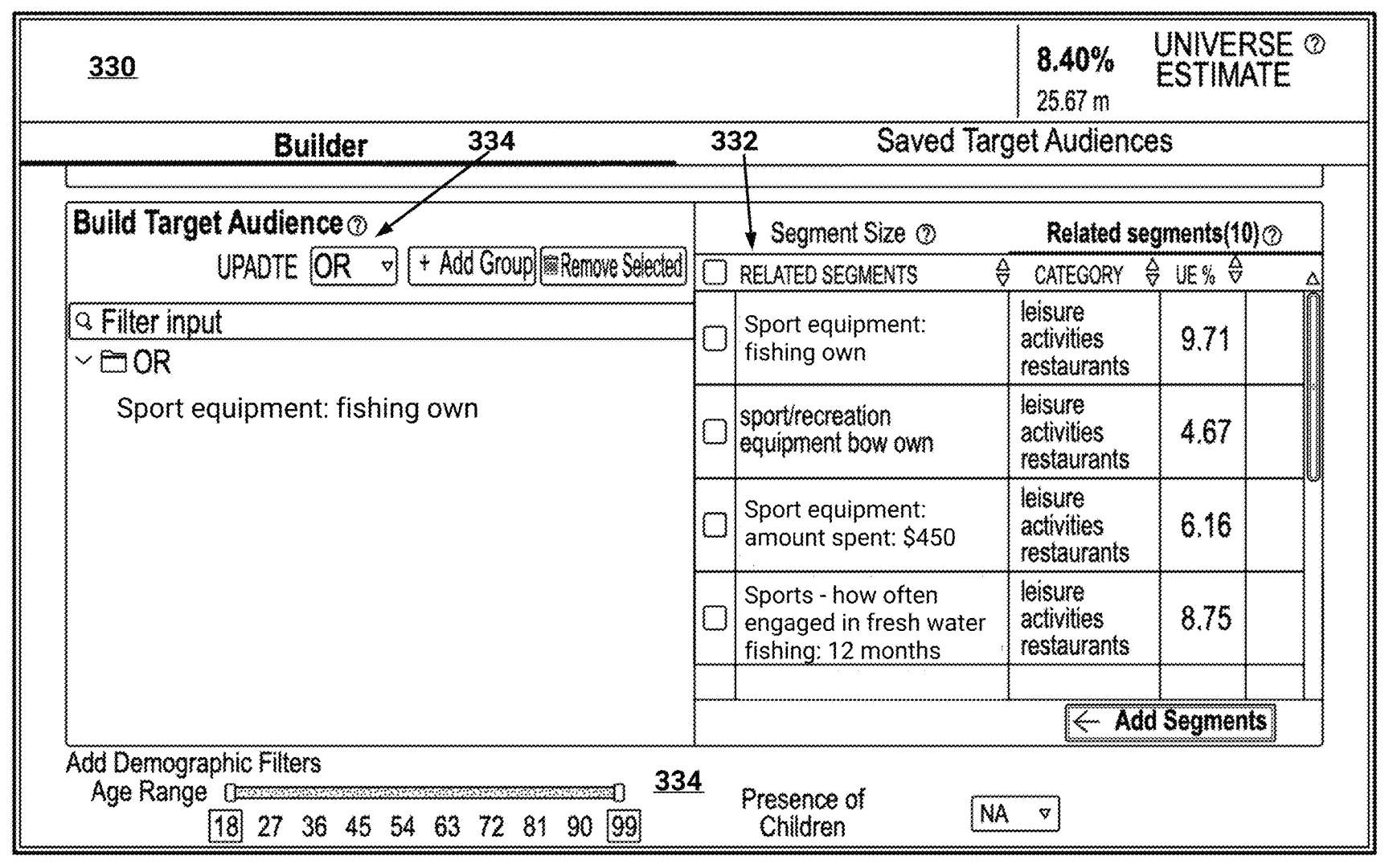

Reference will now be made to FIG. 3C, which illustrates an example user interface 330 presenting related segments. In the illustrated example, related segments 332 have been determined. These related segments 332 may be selected by the user of the user interface 330. In this way, the audience being created by the user may be expanded in size. Additionally, these related segments may surface segments of which the user may be unaware. That is, due to the number of segments the user may be unable to surface all segments of interest to him/her.

In some embodiments, the user may combine segments using Boolean expressions. For example, interactive element 334 may be used to combine segments with an 'AND', 'OR,' or 'NOT' statement. As an example, the user may indicate that a segment selected in user interface 320 is to be combined using an 'AND' statement with one or more of the related segments in user interface 330. The information associated with these segments, such as viewership information, may then be aggregated based on the Boolean expression. For example, rating information may represent rating information which is an intersection of rating information from the two segments. This may provide the user of the user interface 330 with much more detailed, and fine-grained, information as compared to other techniques.

The user interface 330 may further include demographic controls 334. For example, the user may indicate that only viewers in a certain age range are to be used when determining analyses of the created audience. As another example, the user may indicate whether viewers who have children are to be included in the created audience. In this way, the user may filter viewers according to different characteristics.

At block 210, the system determines analysis information. As described above, the user may select segments for inclusion in the created audience. For example, the segments may be responsive to features provided by the user. As another example, the segments may be related to segments responsive to the features. The user may additionally filter users according to different characteristics (e.g., characteristics of content). For example, demographic controls 334 may be used. Additional characteristics may include, location, job, preference of streaming platform, or any customized characteristic which is represented in, or derivable from, the datasets described herein.

Figure 4A:
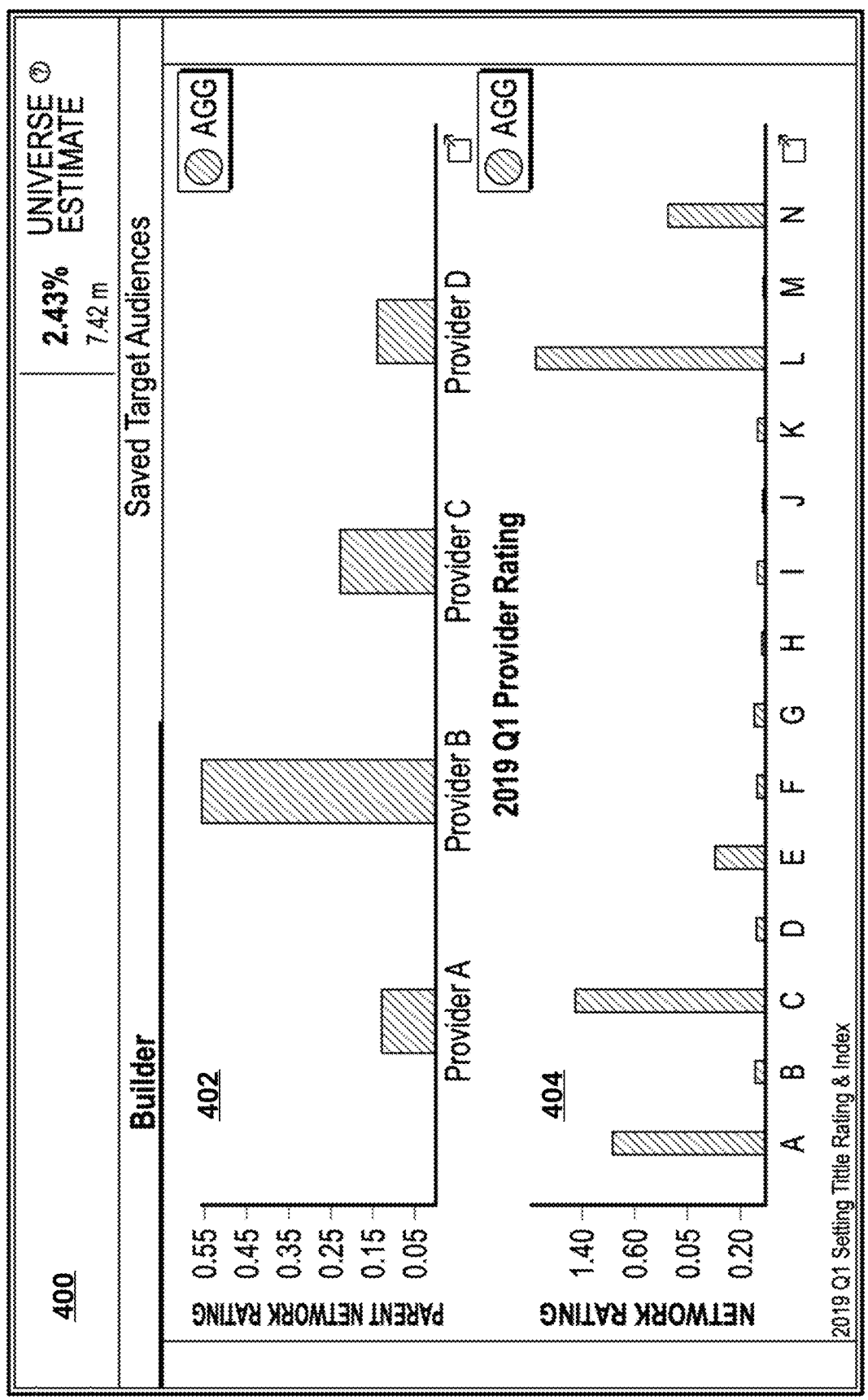
FIGS. 4A-4D illustrate example user interfaces presenting analysis information according to different reports.

Examples of analysis information are included in FIGS. 4A-4D. FIGS. 4A-4D illustrate example user interfaces presenting analysis information according to different reports. FIG. 4A illustrates a user interface 400 presenting rating information for viewers in the created audience. In the example, a bar chart 402 representing rating of parent content providers is included. A parent content provider may represent an entity which creates content items via different sub-content providers. For example, a podcast network may be a parent content provider. In this example, the podcast network may have multitudes of different podcasts, podcast channels, and so on. A bar chart 404 for rating information of different content providers is included. This may represent sub-content providers. In this way, the user of user interface 400 may quickly understand which content providers the created audience values or watches highly.

Figure 4B:
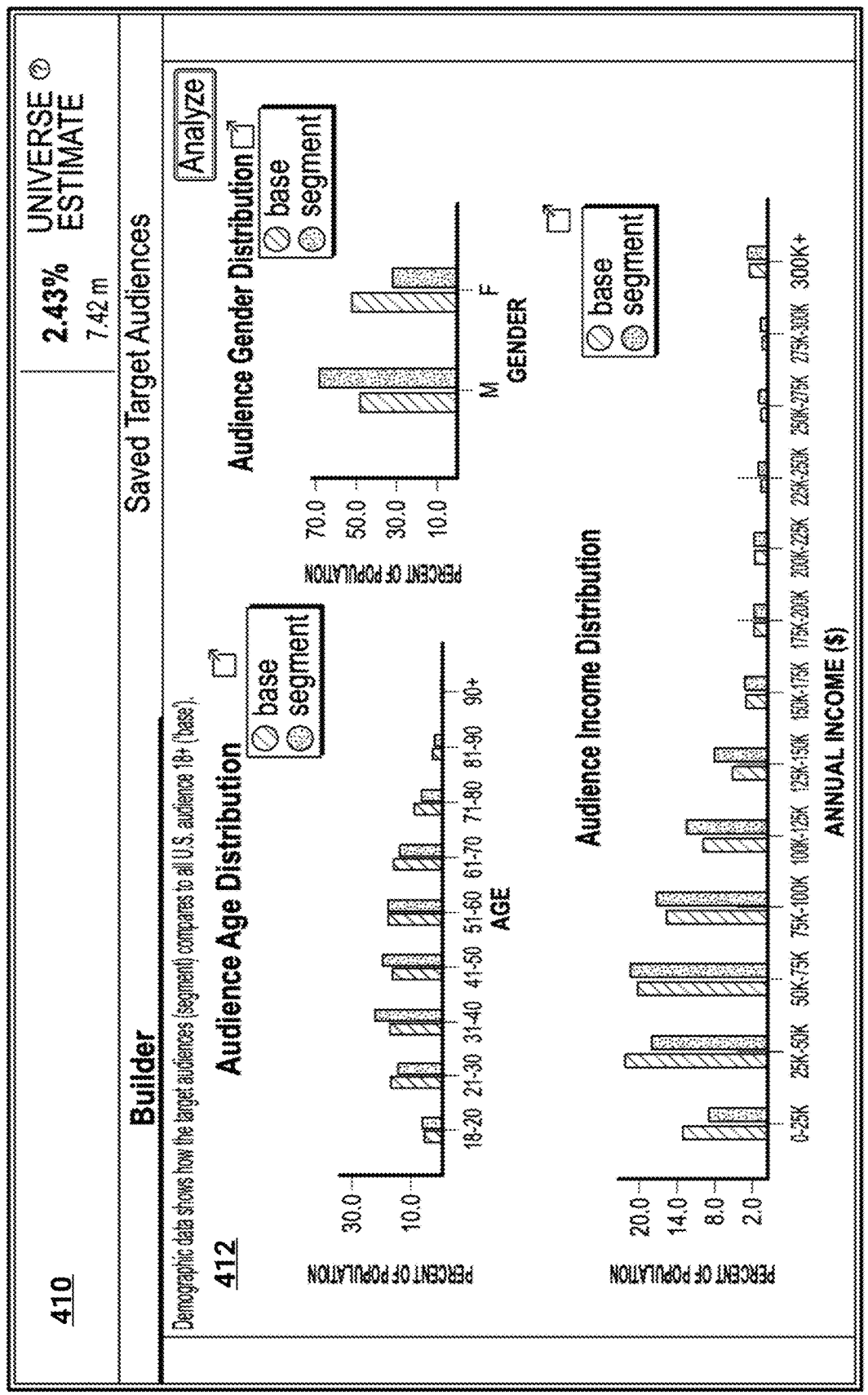

FIG. 4B illustrates a user interface 410 presenting demographic information 412. Example demographic information 412 may include an age distribution, gender distribution, income distribution, and so on. In some embodiments, location information may be presented. For example, an interactive map presenting hot spots or clusters of viewers in the audience may be included. In this example, the locations may be approximated to within a certain distance of the viewers' actual locations. In this way, specific locations may be obfuscated from the user of the user interface 410. The interactive map may be zoomable, such that the clusters may be expanded in size, or reduced in size, based on a zoom level.

Figure 4C:
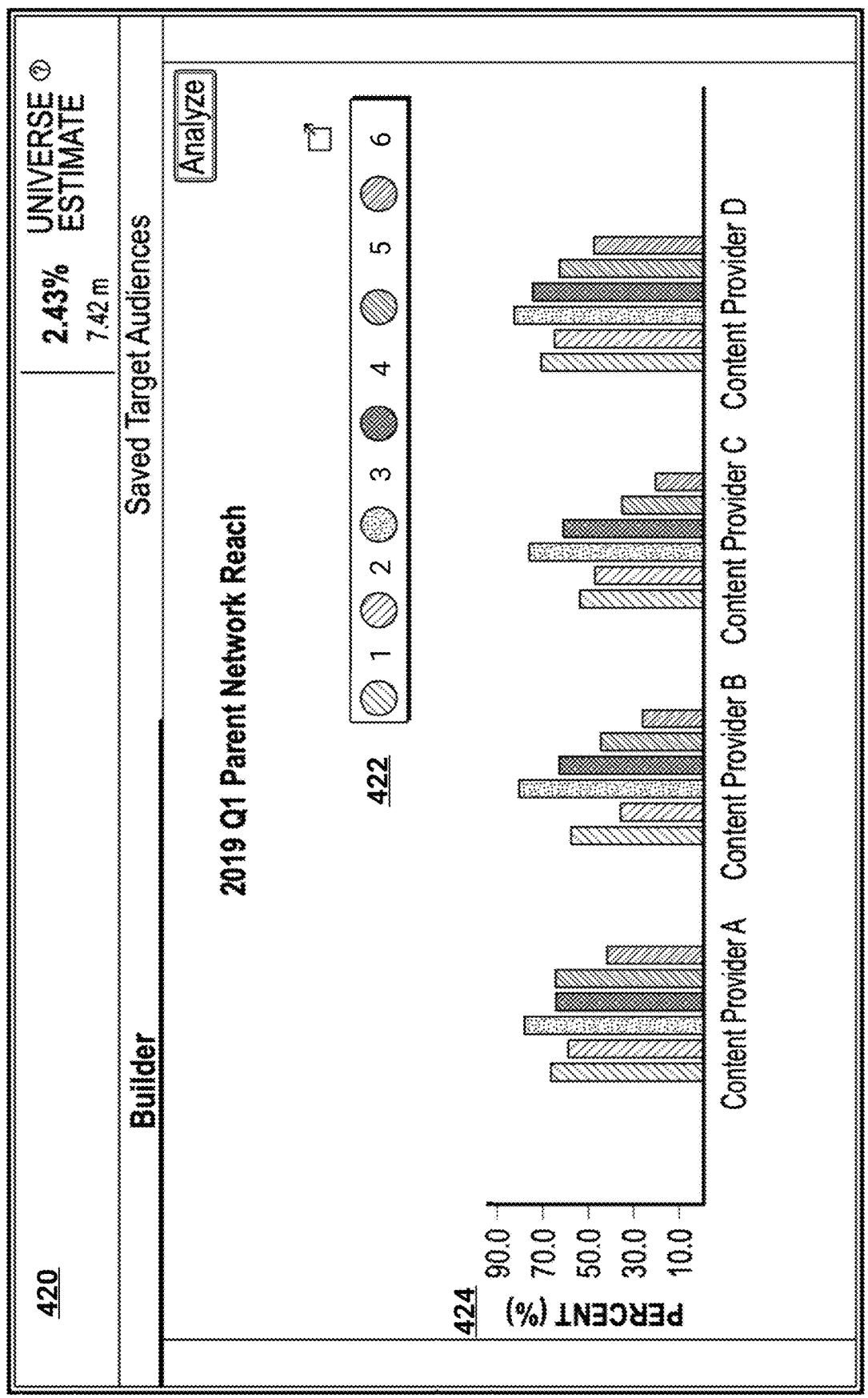

FIG. 4C illustrates a user interface 420 presenting reach information associated with the created audience. In the example, the user interface 420 includes example advertisement networks or creators 422. Content providers are represented in a bar chart 424. Via this user interface 420, a user may ascertain which advertisement network has a higher reach based on content providers being viewed by viewers in the audience.

Figure 4D:
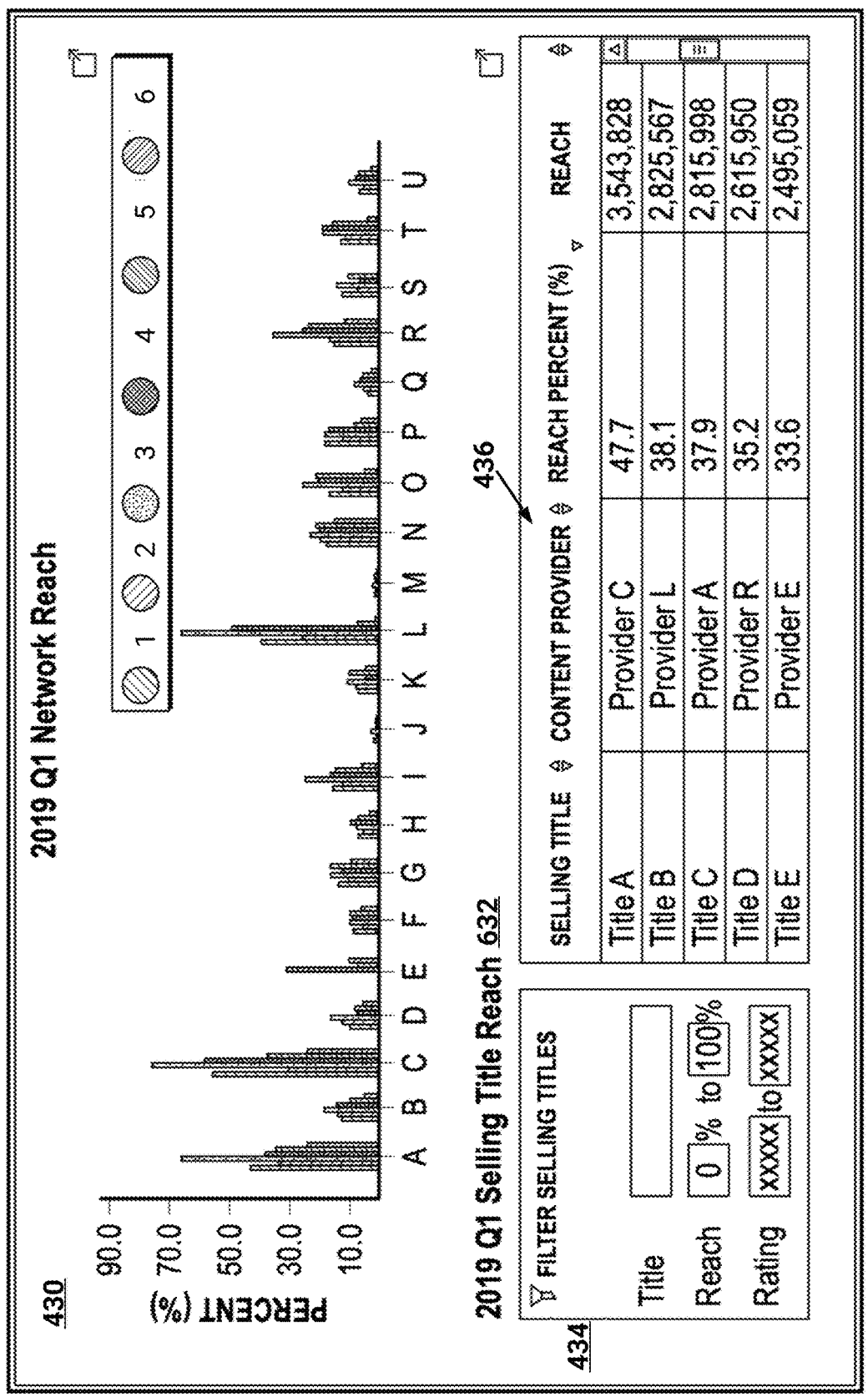

FIG. 4D illustrates a user interface 430 presenting reach information associated with the created audience. In the example, example content items 432 are included. These content items 432 may represent content items which are most associated with the audience. For example, the viewers included in the created audience may be most likely to watch a content item, listen to a podcast, and so on. The user may use interactive portion 434 to search for a specific title of a content item, specific reach values, specific rating information, and so on. Portion 434 includes a list of example content items, which may be organized according to reach, content provider, reach percentage, and so on.

Figure 5:
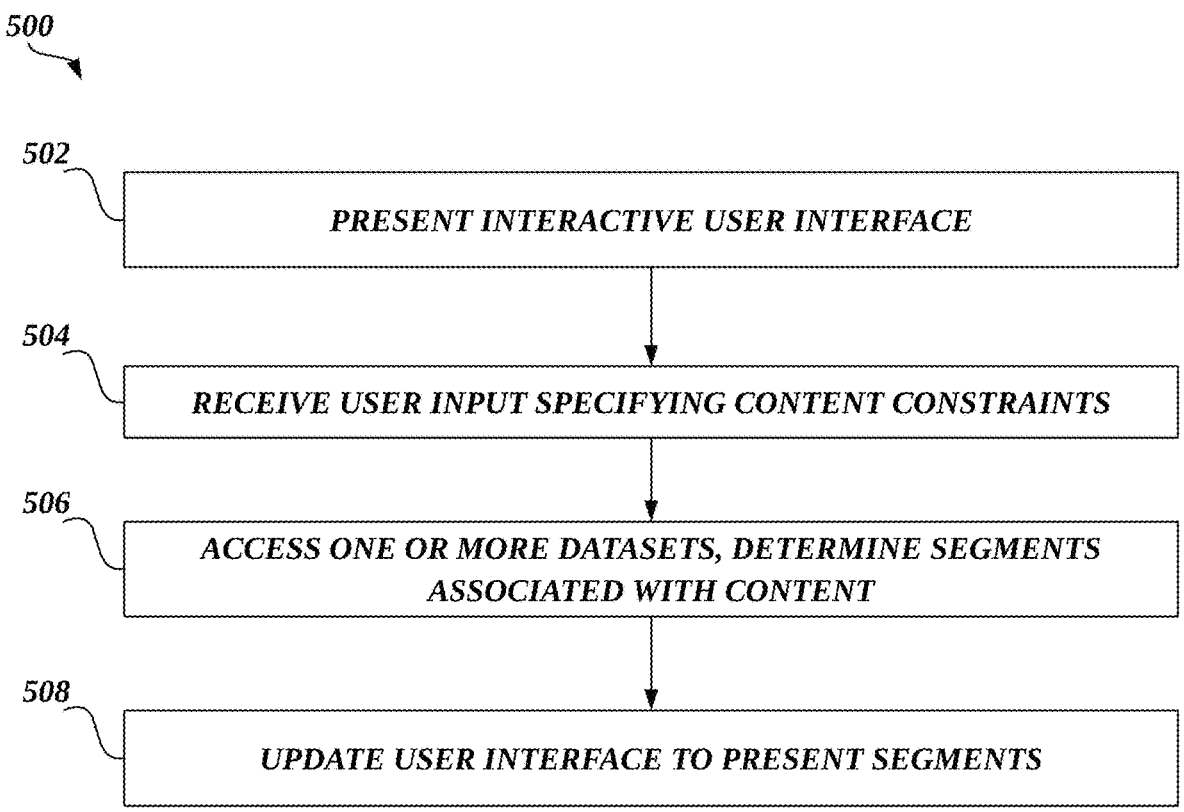
FIG. 5 is a flowchart of an example process for presenting segments associated with specified content item constraints.

FIG. 5 is a flowchart of an example process 500 for presenting segments associated with specified content item constraints. For convenience, the process 500 will be described as being performed by a system of one or more computers (e.g., the segment association system 140).

At block 502, the system presents an interactive user interface. The user interface may be used to identify segments which are most associated with certain content items or content providers. For example, the user interface may enable the specification of a particular name associated with a content item. As another example, the user interface may enable the specification of a name associated with a content provider. The user interface may further include elements to specify a year, a quarter, a parent content provider, daypart information, dataset name, and so on.

It may be appreciated that certain viewers may prefer, or be known (e.g., based on the datasets described herein) to view, certain content items. As an example, a podcast may be specific to the review of a certain type of restaurant. Advantageously, the system may determine segments of viewers of this podcast which are most associated with the podcast. For example, the determined segments may have rated the podcast most highly as compared to other segments. As another example, the determined segments may represent viewers who are most consistent in viewing the podcast. As another example, the determined segments may represent viewers who have listened to a greatest quantity of the podcast. As another example, the determined segments may represent viewers who have most subscribed to the podcast. Thus, in these examples, a determined segment may represent viewers who have one or more same features. For example, the determined segment may represent viewers who have recently purchased restaurant gift cards. As another example, the determined segment may represent viewers who have indicated they travel greater than a certain threshold distance to try restaurants.

With respect to the above example of a podcast, certain advertisements may be preferable for inclusion in the podcast. Thus, user may use the user interface to specify a title of the podcast. As will be described below, the user interface may then update to present segments which are most associated with the podcast.

At block 504, the system receives user input specifying constraints. As described above, the user interface may include input portions associated with different constraints. Thus, a user of the user interface may specify a constraint indicating a name of a content item, content provider, and so on.

At block 506, the system determines segments associated with constraints. The system accesses the datasets described herein and determines segments which are most associated with the constraints. The system may optionally determine a threshold number, for example 5, 10, 15, and so on, which are most associated with the constraints. With respect to a content item, the system may determine segments which include viewers that are known to most watch the content item, rate the content item most highly, and so on. With respect to a content provider, the system may determine segments which include viewers that are known to most watch the associated content items, rate the content provider or associated content items most highly, and so on.

To determine segments, the system may determine a degree of association between content items associated with the constraints and segments. In some embodiments, the degree of association may be determined using a term frequency-inverse document frequency ("TF-IDF") function, such as:

$$segmentMinutes_{p,q} \times \log\left(\frac{totalMinutes_q}{totalSegmentMinutes_q}\right)$$

In the above function, the term frequency ("TF") segmentMinutes$_{p,q}$ is the total number of minutes that the selected segment viewed a content item or timeslot p (which is associated with a particular content provider) during a time period q. The inverse document frequency ("IDF") is a logarithmic function that includes a numerator totalMinutes$_q$, which is the total number of minutes of available content during the time period q (regardless of how many people watched it or how often it was watched), and a denominator totalSegmentMinutes$_q$, which is the total number of minutes that individuals in the segment viewed any content item during the time period q.

The above-described TF-IDF function thus quantifies the degree of association between a segment and a content item. The function, as an example, may act as a weighting function. For example, a segment of "people who have been to the supermarket in the past twelve months" may be large relative to the total population of viewers, and thus the TF of the segment may be relatively high for any given content item. However, the relative size of the segment causes it to have a relatively low IDF, and so the function is only likely to identify a high degree of association between a content item and a large segment if the TF for the content item (that is, the total amount of time this segment spends viewing the content item) is exceptionally high. As a further example, a segment of "people whose hobbies include mountain climbing" may be relatively small compared to the total population, and thus the segment would have a relatively high IDF. However, the segment would have a relatively low TF in light of its relative size. The function thus identifies segments which are large enough to have a significant TF (and thus be large enough to be of interest to advertisers) but also small enough to have a significant IDF (and thus be targetable with specific advertisements). In various embodiments, the degree of association may be determined based on minutes viewed, distinct viewers, or similar criteria.

Further description related to the TF-IDF function is described in U.S. patent application Ser. No. 16/428,46, which is hereby incorporated by reference in its entirety.

At block 508, the system updates the user interface to present the determined segments. The system presents the segments, such as a name associated with each segment. The name may represent the features of the segments. Thus, the user may quickly identify features which are most associated with a particular content item or content provider. These identified features may inform optimal association between an advertisement and a content item.

FIG. 6 illustrates an example user interface 600 presenting segments 604 associated with content constraints. The user interface 600 includes input portions 602 identifying parameters (e.g., characteristics) of content. Example parameters may include year, quarter, parent provider, content provider, content item, daypart, dataset source, in a particular segment, and so on. It may be appreciated that each portion 602 may include a multitude of values. For example, the user of user interface 600 may indicate two or more content items. Thus, the surfaced segments may be segments which are most associated with both of these content items. As another example, Boolean expressions may be used. For example, the user of user interface 600 may indicate 'first content item and not second content item.' In this example, the surfaced segments may be most associated with the first content item and least associated with the second content item. In some embodiments, the user may assign a weight or priority to information included in the portions 602. For example, the user of user interface 600 may indicate two content items in portion 602. The user may indicate that he/she is more interested in viewers who are most associated with the first content item as compared to the second content item.

As illustrated, user interface 600 includes segments 604 most associated with the constraints in portion 602. These segments 604 may be ranked according to different metrics, such as rating information, viewing time information, reach information, and so on.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 7 is a block diagram that illustrates a computer system 700 upon which various embodiments may be implemented. Computer system 700 includes a bus 702 or other communication mechanism for communicating information, and a hardware processor 704, or multiple processors 704, coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, solid state drive, USB thumb drive (flash drive), etc., is provided and coupled to bus 702 for storing information and instructions.

Computer system 700 may be coupled via bus 702 to a display 712, such as a cathode ray tube (CRT) or LCD display (or touchscreen), for displaying information to a computer user. An input device 714, including alphanumeric and other keys, is coupled to bus 702 for communicating information and command selections to processor 704. Another type of user input device is cursor control 716, such as a mouse, trackball, trackpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touchscreen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 7210 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710 or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope

What is claimed is:

1. A method comprising:
by a system of one or more computers,
accessing information specifying associations between segments associated with viewers and content items, each segment indicating one or more common features of viewers; and
generating an interactive user interface for presentation via a user device, the interactive user interface enabling creation of a customized viewing audience, and wherein the interactive user interface:
receives user input indicating features associated with the customized viewing audience, wherein the user input triggers identification, by the system, of a plurality of segments based on the associations, and wherein the segments are responsive to the features; and
presents summary information derived from a combination of at least a subset of the segments to form the customized viewing audience.

2. The method of claim 1, wherein the segments are combined using one or more Boolean expressions.

3. The method of claim 1, wherein the subset of the segments include one or more segments responsive to the user input and one or more other segments determined to be related to the one or more segments.

4. The method of claim 1, wherein the indicated features are assigned respective importances, and wherein the interactive user interface:
presents information identifying the segments, wherein the segments are ordered based on the importances.

5. The method of claim 1, wherein the graphical user interface is configured to receive information associated with content and present segments responsive to the information.

6. The method of claim 1, wherein the presented segments comprise features associated with the segments.

7. The method of claim 1, wherein the summary information comprises rating information, wherein the interactive user interface presents one or more graphical depictions of the rating information, and wherein a particular graphical depiction comprises a chart illustrating rating information associated with a multitude of content items or content providers.

8. The method of claim 1, wherein the summary information comprises reach information associated with different content providers.

9. A system comprising one or more processors and non-transitory computer storage media storing instructions that when executed by the one or more processors, cause the processors to:
access information specifying associations between segments associated with viewers and content items, each segment indicating one or more common features of viewers; and
generate an interactive user interface for presentation via a user device, the interactive user interface enabling creation of a customized viewing audience, and wherein the interactive user interface:
receives user input indicating features associated with the customized viewing audience, wherein the user input triggers identification, by the system, of a plurality of segments based on the associations, and wherein the segments are responsive to the features; and
presents summary information derived from a combination of at least a subset of the segments to form the customized viewing audience.

10. The system of claim 9, wherein the segments are combined using one or more Boolean expressions.

11. The system of claim 9, wherein the subset of the segments include one or more segments responsive to the user input and one or more other segments determined to be related to the one or more segments.

12. The system of claim 9, wherein the indicated features are assigned respective importances, and wherein the interactive user interface:
presents information identifying the segments, wherein the segments are ordered based on the importances.

13. The system of claim 9, wherein the graphical user interface is configured to receive information associated with content and present segments responsive to the information.

14. The system of claim 9, wherein the presented segments comprise features associated with the segments.

15. The system of claim 9, wherein the summary information comprises rating information, wherein the interactive user interface presents one or more graphical depictions of the rating information, and wherein a particular graphical depiction comprises a chart illustrating rating information associated with a multitude of content items or content providers.

16. The system of claim 9, wherein the summary information comprises reach information associated with different content providers.

17. Non-transitory computer storage media storing instructions that when executed by a system of one or more computers, cause the system to:
access information specifying associations between segments associated with viewers and content items, each segment indicating one or more common features of viewers; and
generate an interactive user interface for presentation via a user device, the interactive user interface enabling creation of a customized viewing audience, and wherein the interactive user interface:
receives user input indicating features associated with the customized viewing audience, wherein the user input triggers identification, by the system, of a plurality of segments based on the associations, and wherein the segments are responsive to the features; and presents summary information derived from a combination of at least a subset of the segments to form the customized viewing audience.

18. The computer storage media of claim 17, wherein the segments are combined using one or more Boolean expressions.

19. The computer storage media of claim 17, wherein the subset of the segments include one or more segments responsive to the user input and one or more other segments determined to be related to the one or more segments.

20. The computer storage media of claim 17,
wherein the summary information comprises rating information, wherein the interactive user interface presents one or more graphical depictions of the rating information, and wherein a particular graphical depiction comprises a chart illustrating rating information associated with a multitude of content items or content provider, or wherein the summary information comprises reach information associated with different content providers.

\* \* \* \* \*